(12) United States Patent
Guan et al.

(10) Patent No.: US 12,430,361 B2
(45) Date of Patent: Sep. 30, 2025

(54) METHODS AND SYSTEMS FOR DATA SYNCHRONIZATION, AND COMPUTER-READABLE STORAGE MEDIA

(71) Applicant: BOE Technology Group Co., Ltd., Beijing (CN)

(72) Inventors: Rui Guan, Beijing (CN); Ning Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/293,306

(22) PCT Filed: Feb. 20, 2023

(86) PCT No.: PCT/CN2023/077059
§ 371 (c)(1),
(2) Date: Jan. 29, 2024

(87) PCT Pub. No.: WO2023/185310
PCT Pub. Date: Oct. 5, 2023

(65) Prior Publication Data
US 2025/0094446 A1    Mar. 20, 2025

(30) Foreign Application Priority Data
Mar. 29, 2022  (CN) .......................... 202210323972.9

(51) Int. Cl.
*G06F 16/27* (2019.01)
*G06F 3/04847* (2022.01)
*G06F 16/25* (2019.01)

(52) U.S. Cl.
CPC ........ *G06F 16/275* (2019.01); *G06F 3/04847* (2013.01); *G06F 16/254* (2019.01)

(58) Field of Classification Search
CPC ... G06F 16/275; G06F 16/254; G06F 3/04847
See application file for complete search history.

(56) References Cited

U.S. PATENT DOCUMENTS

| 2005/0183098 | A1* | 8/2005 | Llic ...................... | G05B 19/042 |
| | | | | 719/328 |
| 2014/0047414 | A1* | 2/2014 | Attar ...................... | G06F 9/4411 |
| | | | | 717/121 |

(Continued)

FOREIGN PATENT DOCUMENTS

| CN | 107145368 A | 9/2017 |
| CN | 110334146 A | 10/2019 |

(Continued)

OTHER PUBLICATIONS

PCT/CN2023/077059 international search report dated May 26, 2023.
PCT/CN2023/077059 Written Opinion dated May 26, 2023.

*Primary Examiner* — Sherief Badawi
*Assistant Examiner* — Earl Levi Elias
(74) *Attorney, Agent, or Firm* — IPro, PLLC

(57) ABSTRACT

The present disclosure relates to a method and a system for data synchronization, and a computer-readable storage medium. In the method, multiple data sources are connected in response to the operation of configuring data sources in the first interactive interface. Then, in response to the operation of creating a task in the second interactive interface, a task configuration file can be generated. Afterwards, in response to the operation of starting the data synchronization task in the third interactive interface, the to-be-synchronized data is synchronized from the source data source to the target data source. In this way, in the embodiments, data transmission between different data sources can be achieved through visual configuration operations, without the need for repeated development, and the configuration process is simple, which can reduce learning costs.

6 Claims, 13 Drawing Sheets

(56) References Cited

U.S. PATENT DOCUMENTS

| | | | | |
|---|---|---|---|---|
| 2014/0189076 | A1* | 7/2014 | Creasman | H04L 41/0806 |
| | | | | 709/220 |
| 2015/0269320 | A1* | 9/2015 | Chadha | G06F 16/258 |
| | | | | 707/741 |
| 2016/0134534 | A1* | 5/2016 | Tan | H04L 41/0803 |
| | | | | 370/392 |
| 2017/0147601 | A1 | 5/2017 | Kaushik et al. | |
| 2020/0192875 | A1* | 6/2020 | Rudolf | G06F 16/1734 |
| 2022/0116672 | A1* | 4/2022 | Du | H04L 67/141 |

FOREIGN PATENT DOCUMENTS

| | | |
|---|---|---|
| CN | 112148788 A | 12/2020 |
| CN | 114691779 A | 7/2022 |

* cited by examiner

METHODS AND SYSTEMS FOR DATA SYNCHRONIZATION, AND COMPUTER-READABLE STORAGE MEDIA

CROSS-REFERENCE TO RELATED APPLICATIONS

This application is a national stage of international PCT Application No. PCT/CN2023/077059 filed on Oct. 5, 2023, the entire contents of which are incorporated herein by reference.

TECHNICAL FIELD

The present disclosure relates to the technical field of data processing, in particular to methods and systems for data synchronization, and computer-readable storage media.

BACKGROUND

At present, various industries construct different data centers which are isolated from each other. When data from two data centers is required, data from one data center can be synchronized to another. For example, in related technologies, a data ETL (Extract-Transform-Load) tool can extract data from a cluster in one data center and synchronize the data to a cluster in another data center. For this, it is usually necessary to develop a corresponding ETL tool for each data center in related technologies. However, developing ETL tools repeatedly in different data centers or projects will waste development time, prolong development cycles, and reduce development efficiency.

SUMMARY

The present disclosure provides methods and systems for data synchronization, and computer-readable storage media, to address the shortcomings of related technologies.

According to the first aspect of the embodiments of the present disclosure, a method for data synchronization is provided, and includes:
in response to an operation of configuring data sources in a first interactive interface, connecting the data sources;
in response to an operation of creating a task in a second interactive interface, generating a task configuration file; and
in response to an operation of starting a data synchronization task in a third interactive interface, synchronizing to-be-synchronized data from a source data source to a target data source.

In some embodiments, in response to the operation of configuring the data sources in the first interactive interface, connecting the data sources comprises:
in response to an operation of selecting data sources in the first interactive interface, obtaining the data sources corresponding to the operation, wherein the data sources include a source data source and a target data source;
in response to an operation of modifying a configuration parameter in the first interactive interface, obtaining a target configuration parameter;
in response to an operation of testing a connection between the source data source and the target data source in the first interactive interface, attempting to connect the source data source and the target data source; and in response to a successful connection, saving the data sources.

In some embodiments, the synchronization rule adopting hot update includes:
in response to an operation of modifying the target configuration parameter, modifying the target configuration parameter of a configuration table in the task configuration file, wherein the task configuration file is stored in the target database.

In some embodiments, in response to the operation of creating the task in the second interactive interface, generating the task configuration file comprises:
in response to an operation of configuring task information in the second interactive interface, obtaining task information;
in response to an operation of selecting the source data source in the second interactive interface, obtaining the source data source;
in response to an operation of selecting to-be-synchronized data in the second interactive interface, obtaining the to-be-synchronized data;
in response to an operation of selecting a synchronization rule in the second interactive interface, obtain the synchronization rule;
in response to an operation of selecting the target data source in the second interactive interface, obtaining the target data source;
in response to an operation of configuring an execution cycle and frequency in the second interactive interface, obtaining the execution cycle and frequency; and
in response to an operation of creating a data synchronization task in the second interactive interface, creating a target task, wherein the target task is used for synchronizing the to-be-synchronized data from the source data source to the target data source according to the execution cycle and frequency, and the synchronization rule.

In some embodiments, in response to the operation of starting the data synchronization task in the third interactive interface, synchronizing the to-be-synchronized data from the source data source to the target data source comprises:
in response to an operation of starting the data synchronization task, determining a task type of a started task, and selecting a data synchronization plugin based on the task type;
parsing the task configuration file to obtain the source data source, the target data source, a synchronization rule, an execution cycle and frequency, and the to-be-synchronized data;
reading the to-be-synchronized data from the source data source and determining whether to convert the to-be-synchronized data based on the synchronization rule;
in response to determining to convert the to-be-synchronized data, converting the to-be-synchronized data; in response to determining not to convert the to-be-synchronized data, outputting converted data to the target data source; and
obtaining execution result data.

In some embodiments, a synchronization rule adopts hot update.

In some embodiments, the synchronization rule adopting hot update includes:
testing a new synchronization rule;
in response to determining that the new synchronization rule is correct, processing the new synchronization rule into a target data packet in a target document format, wherein the target document format matches a rule loading interface; and storing the target data packet in a preset designated directory, enabling the preset rule loading interface to read the target data packet and use the synchronization rule corresponding to the target data packet.

According to the second aspect of the embodiments of the present disclosure, a system for data synchronization is provided, which includes a data source management module, a task management module, and a background task starting module, wherein the data source management module is configured to, in response to an operation of configuring data sources in a first interactive interface, connect the data sources;

the task management module is configured to, in response to an operation of creating a task in a second interactive interface, generate a task configuration file; and the background task starting module is configured to, in response to an operation of starting a data synchronization task in a third interactive interface, synchronize to-be-synchronized data from a source data source to a target data source.

In some embodiments, when in response to the operation of configuring the data sources in the first interactive interface, connecting the data sources, the data source management module performs:

in response to an operation of selecting data sources in the first interactive interface, obtaining the data sources corresponding to the operation, wherein the data sources include a source data source and a target data source;

in response to an operation of modifying a configuration parameter in the first interactive interface, obtaining a target configuration parameter;

in response to an operation of testing a connection between the source data source and the target data source in the first interactive interface, attempting to connect the source data source and the target data source; and in response to successful connection, saving the data source; or, in response to unsuccessful connection, re-obtaining a target configuration parameter.

In some embodiments, the task management module updating the synchronization rule in the manner of the hot update comprises:

in response to an operation of modifying the target configuration parameter, modifying the target configuration parameter of a configuration table in the task configuration file, wherein the task configuration file is stored in the target database.

In some embodiments, when in response to the operation of creating the task in the second interactive interface, generating the task configuration file, the task management module performs:

in response to an operation of configuring task information in the second interactive interface, obtaining task information;

in response to an operation of selecting the source data source in the second interactive interface, obtaining the source data source;

in response to an operation of selecting to-be-synchronized data in the second interactive interface, obtaining the to-be-synchronized data;

in response to an operation of selecting a synchronization rule in the second interactive interface, obtain the synchronization rule;

in response to an operation of selecting the target data source in the second interactive interface, obtaining the target data source;

in response to an operation of configuring an execution cycle and frequency in the second interactive interface, obtaining the execution cycle and frequency; and in response to an operation of creating a data synchronization task in the second interactive interface, creating a target task, wherein the target task is used for synchronizing the to-be-synchronized data from the source data source to the target data source according to the execution cycle and frequency, and the synchronization rule.

In some embodiments, when in response to the operation of starting the data synchronization task in the third interactive interface, synchronizing the to-be-synchronized data from the source data source to the target data source, the background task starting module performs:

in response to an operation of starting the data synchronization task, determining a task type of a started task, and selecting a data synchronization plugin based on the task type;

parsing the task configuration file to obtain the source data source, the target data source, a synchronization rule, an execution cycle and frequency, and the to-be-synchronized data;

reading the to-be-synchronized data from the source data source, and determining whether to convert the to-be-synchronized data based on the synchronization rule;

in response to determining to convert the to-be-synchronized data, converting the to-be-synchronized data; in response to determining not to convert the to-be-synchronized data, outputting converted data to the target data source; and obtaining execution result data.

In some embodiments, the task management module is further configured to update a synchronization rule in a manner of hot update.

In some embodiments, the task management module updating the synchronization rule in the manner of the hot update comprises:

testing a new synchronization rule;

in response to determining that the new synchronization rule is correct, processing the new synchronization rule into a target data packet in a target document format, wherein the target document format matches a rule loading interface; and storing the target data packet in a preset designated directory, enabling the preset rule loading interface to read the target data packet and use the synchronization rule corresponding to the target data packet.

According to the third aspect of embodiments of the present disclosure, a non-transitory computer-readable storage medium is provided, wherein when an executable computer program in the storage medium is executed by a processor, the method according to the first aspect is implemented.

The technical solutions provided by the embodiments of the present disclosure can include following beneficial effects.

From the above embodiments, it can be seen that the solutions provided in the present disclosure can connect multiple data sources in response to the operation of configuring data sources in the first interactive interface. Then, in response to the operation of creating a task in the second interactive interface, a task configuration file can be generated. Afterwards, in response to the operation of starting the data synchronization task in the third interactive interface, the to-be-synchronized data is synchronized from the source data source to the target data source. In this way, in the embodiments, data transmission between different data sources can be achieved through visual configuration operations, without the need for repeated development, and the configuration process is simple, greatly reducing learning costs.

It is to be understood that the above general descriptions and the below detailed descriptions are merely exemplary and explanatory, and are not intended to limit the present disclosure.

BRIEF DESCRIPTION OF DRAWINGS

Accompanying drawings herein are incorporated into and constitute a part of the specification, illustrate embodiments consistent with the present disclosure, and are combined with the description to explain the principle of the present disclosure.

DETAILED DESCRIPTION

Embodiments will be described in detail herein, examples of which are illustrated in the accompanying drawings. Where the following description refers to the drawings, elements with the same numerals in different drawings refer to the same or similar elements unless otherwise indicated. Embodiments described in the illustrative examples below are not intended to represent all embodiments consistent with the present disclosure. Rather, they are merely embodiments of devices consistent with some aspects of the present disclosure as recited in the appended claims. It should be noted that, without conflict, features in following embodiments can be combined with each other.

Figure 1:
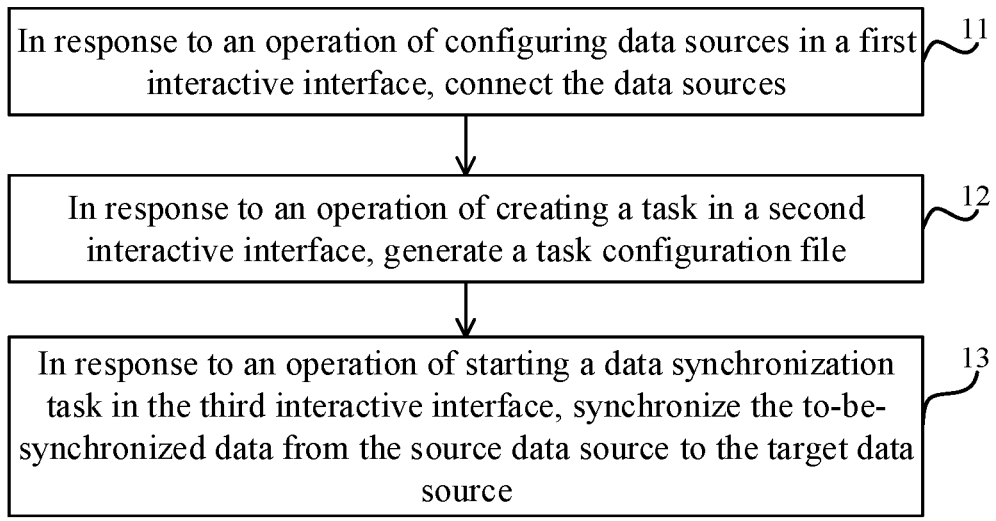
FIG. 1 is a flowchart of a method for data synchronization according to an embodiment.

To address the aforementioned technical problems, the embodiments of the present disclosure provide a method for data synchronization that can be applied to a system for data synchronization. FIG. 1 is a flowchart of a method for data synchronization according to an embodiment. Referring to FIG. 1, the method for data synchronization includes steps 11 to 13.

In step 11, in response to an operation of configuring data sources in a first interactive interface, the data sources are connected.

In this embodiment, an ETL (Extract-Transform-Load) component is pre-deployed in the system for data synchronization. The ETL component can read data from a data source and synchronize the data to another data source, which achieves data synchronization. In an example, an interactive interface can be displayed after the ETL component is started, and the interactive interface is later referred to as the first interactive interface.

It should be noted that a first interactive interface, a second interactive interface, and a third interactive interface can be three independent interactive interfaces, each of which corresponds to a function. For example, the first interactive interface only has selection and candidate functions, and the second interactive interface only has the function of creating tasks. Switching between the two interactive interfaces is achieved by pressing previous or next buttons. In this way, functions of an interactive interface are relatively simple, which is easier to operate and learn, and reduces the difficulty of operation. In some embodiments, the above interactive interfaces can further be integrated into one interface, and users can choose a function in the interface to use. In this way, the content of the interactive interface is more comprehensive, which makes it convenient for users to grasp the method for data synchronization from a global perspective. The skilled in the art can choose whether the first interactive interface, the second interactive interface, and the third interactive interface are set separately or integrated into one interactive interface based on specific scenarios, and the corresponding solutions fall within the scope of protection of the present disclosure.

Figure 2:
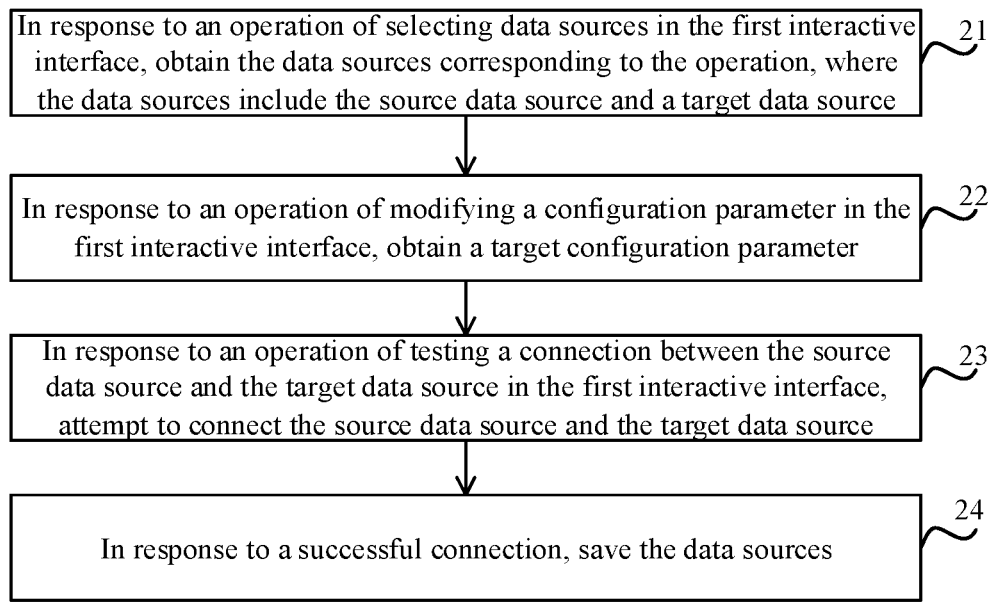
FIG. 2 is a flowchart of connecting a data source according to an embodiment.

Referring to FIG. 2, in step 21, the system for data synchronization can obtain the data sources corresponding to the operation in response to an operation of selecting data sources in the first interactive interface. The first interactive interface includes options for data sources, and the data sources include a source data source and a target data source. The source data source refers to a data source that provides to-be-synchronized data, which can also be understood as an input source of the system for data synchronization. The target data source refers to a data source that stores the to-be-synchronized data, and can also be understood as an output source of the system for data synchronization. After the source data source and the target data source are selected, the system for data synchronization can obtain addresses (such as URL addresses) or interfaces of the data sources. It is understandable that after obtaining the addresses (such as URL addresses) or interfaces of the data source, the system for data synchronization can directly connect to the data sources.

In this step, data sources in a scenario of offline data synchronization are shown in Table 1.

TABLE 1

Data Sources as Input Sources or Output Sources in
Scenario of Offline Data Synchronization

| data source | input | output |
|---|---|---|
| MySQL | √ | √ |
| PostgresSql | √ | √ |
| Clickhouse | √ | √ |
| Mongodb | √ | √ |
| Hdfs | √ | √ |
| ElasticSearch | √ | √ |
| API | √ | |
| Redis | | √ |
| Hive | | √ |
| Kafka | | √ |

In this step, data sources in a scenario of real time subscription are shown in Table 2.

TABLE 2

Data Sources as Input Sources or Output Sources in
Scenario of Real Time Subscription

| data source | input | output |
|---|---|---|
| MySQL | | √ |
| PostgresSql | | √ |
| Clickhouse | | √ |
| Mongodb | | √ |
| Kafka | √ | √ |

In this step, the data sources are divided into input sources or output sources to facilitate users in selecting suitable source data sources and target data sources during a configuration process. For example, in an offline scenario, MySQL, PostgresSql, Clickhouse, Mongodb, Hdfs, ElasticSearch, and API can be selected as the source data source, and in a real-time order scenario, Kafka can be selected as the source data source. Data sources are divided into input and output sources through combining the scenarios and specific characteristics of data sources, which can ensure that users choose reliable data sources and improve configuration efficiency.

In step 22, the system for data synchronization can obtain a target configuration parameter in response to an operation of modifying a configuration parameter in the first interactive interface. The above target configuration parameter includes but is not limited to URL address, port, or other parameters that can uniquely determine a source data source or a target data source. In an example, the first interactive interface includes an option for configuring a parameter, and users can trigger the option to modify the parameter. The system for data synchronization can display a parameter menu in response to an operation of modifying a configuration parameter in the first interactive interface. When a user selects a parameter and a value of the parameter in the parameter menu, the configuration parameter is obtained, which is later referred to as the target configuration parameter. For example, when the user clicks on parameter A, a drop-down menu for parameter A can be displayed, and candidate values for parameter A will be displayed in the drop-down menu. Users can choose a certain candidate value, such that the system for data synchronization can use the selected candidate value as the value of parameter A and store the selected candidate value. For example, when the user clicks on parameter A, a slider bar for parameter A can be displayed, with both ends of the slider bar indicating the maximum and minimum values of parameter A. A user can slide the slider in the above slider bar, and during the slider sliding process, a value for the current position can be displayed around a sliding region (such as above the sliding region). After the user clicks an OK button, the system for data synchronization can take the value for the current sliding position as the value of parameter A and store the value.

In step 23, the system for data synchronization can attempt to connect the source data source and the target data source, in response to an operation of testing a connection between the source data source and the target data source in the first interactive interface. In an example, the first interactive interface further includes an option for testing a connection. Users can operate the above option representing test connections to test whether data can be transmitted between the source data source and the target data source. When the system for data synchronization detects the operation of testing a connection between the source data source and the target data source, the system can separately connect to the source data source and the target data source based on the addresses or interfaces of the data sources in step 21. For example, the system transmits a test request to the source data source or the target data source and receives a response request returned by the source data source or the target data source. If no response information is received within a set period (such as 20 ms), it indicates that there is no connection, if a response message is received, it indicates a successful connection, such that it can be test whether data can be transmitted between the source data source and the target data source. When data can be transmitted between the source data source and the target data source, the system for data synchronization can determine the connection between the source data source and the target data source. If the target data source and the source data source are not connected, the combination of the source data source and the target data source can be adjusted, or the addresses of the source data source and the target data source can be adjusted, and ultimately the connection between the source data source and the target data source is achieved, forming a channel for data synchronization.

In step 24, the system for data synchronization can store the data source in response to a successful connection. It is understandable that the system for data synchronization can store the source data source, the target data source, the target configuration parameter, the connectable combination of the source data source and the target data source.

It can be seen that in this step, the input and output sources for the to-be-synchronized data can be pre-configured into the system for data synchronization. Before data synchronization, the corresponding input and output sources can be selected through the interactive interface to establish a data synchronization channel. Compared with a solution of developing corresponding data synchronization components in related technologies, only the above system for data synchronization needs to be installed, which improves the efficiency of data synchronization.

In step 12, in response to an operation of creating a task in a second interactive interface, a task configuration file is generated.

In this embodiment, after the source data source and the target data source are successfully connected and the data from the data source is stored, the system for data synchronization can display an interactive interface containing an option for creating a task, and the interactive interface is later referred to as the second interactive interface. The option for creating a task can include but are not limited to an option for configuring task information, an option for selecting a source data source, an option for selecting to-be-synchronized data, an option for selecting synchronization rules, an option for selecting a target data source, an option for configuring execution cycle and frequency, and an option for a creating data synchronization task. Options within the interactive interface can be selected based on specific scenarios.

In an example, after the second interactive interface displays the above options, the user can trigger the above options. The system for data synchronization can detect operations within the second interactive interface, such as an operation of detecting configuration task information, an operation of selecting a source data source, an operation of selecting to-be-synchronized data, an operation of selecting synchronization rules, an operation of selecting a target data source, an operation of configuring execution cycle and frequency, and an operation of creating a data synchronization task.

Figure 3:
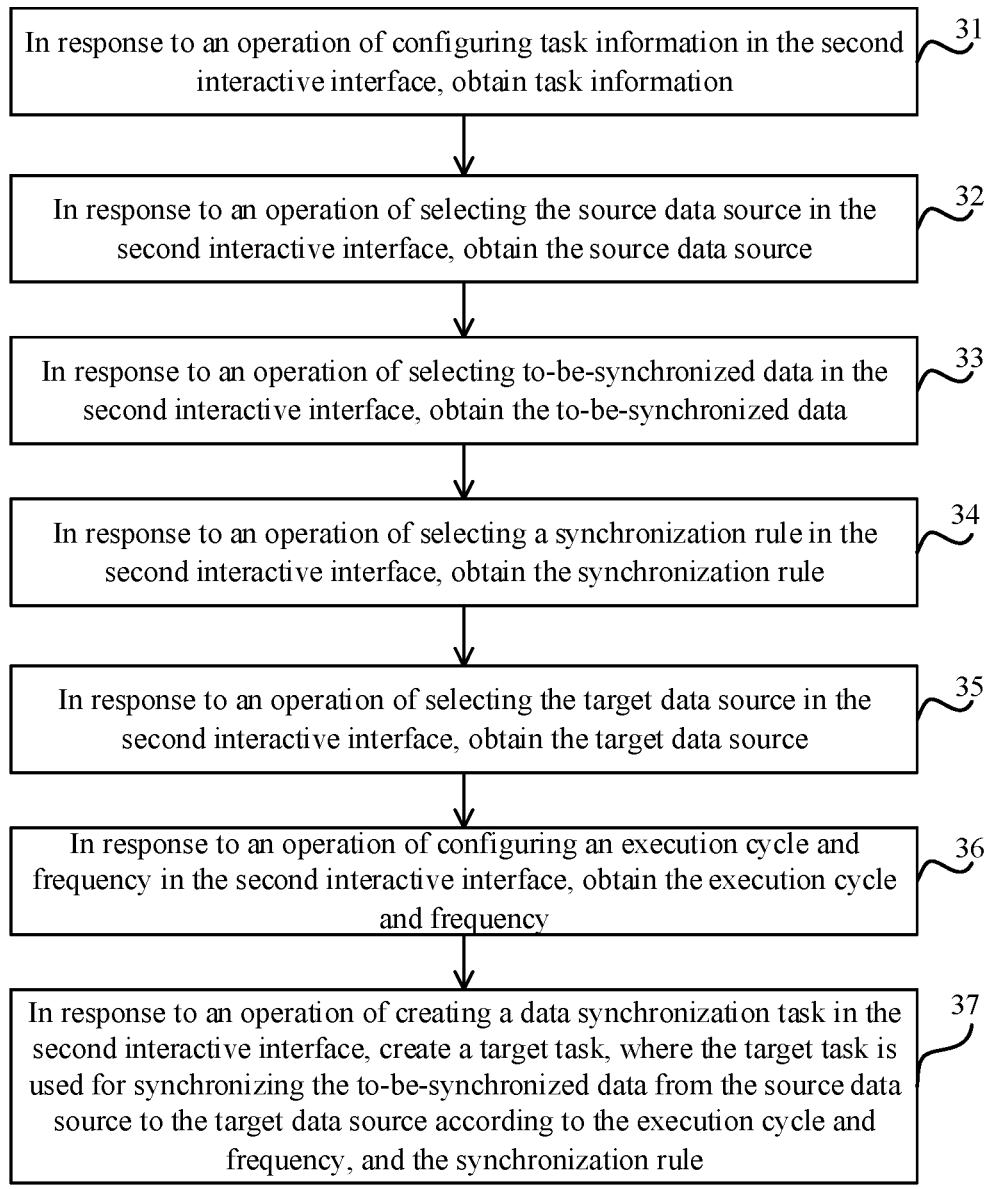
FIG. 3 is a flowchart of generating a task configuration file according to an embodiment.

As shown in FIG. 3, in step 31, when detecting the operation of configuring task information, the system for data synchronization can obtain task information in response to the operation of configuring task information in the second interactive interface. The task information can include but is not limited to the project, business, etc., such as the data synchronization task of business B in project A.

In step 32, after obtaining task information, the system for data synchronization can continue to detect operations in the second interactive interface, and when detecting an operation of selecting a source data source, the system can obtain the selected source data source in response to the operation of selecting the source data source in the second interactive interface. It is understandable that in this step, one (or more) is selected from a data source list as the source data source. The above data source list was created in step 11, that is, selecting data sources in step 11 is selecting data sources from multiple data sources as the source data source or the target data source to create a data source list.

In step 33, after obtaining the source data source, the system for data synchronization can continue to detect operations in the second interactive interface. When detecting an operation of selecting to-be-synchronized data, the system can obtain the selected to-be-synchronized data in response to the operation of selecting to-be-synchronized data in the second interactive interface, that is, the aforementioned to-be-synchronized data is data from the selected source data source. For example, to-be-synchronized data can include but not be limited to databases, data tables, or data fields.

In step 34, after obtaining the to-be-synchronized data, the system for data synchronization can continue to detect operations in the second interactive interface. When detecting an operation of selecting a synchronization rule, the system can obtain the selected synchronization rule in response to the operation of selecting the synchronization rule in the second interactive interface. Multiple synchronization rules are pre-set in the system for data synchronization, or user customizes a synchronization rule. For example, for SQL databases, specified SQL statements can be used and results after execution can be synchronized.

Figure 10:
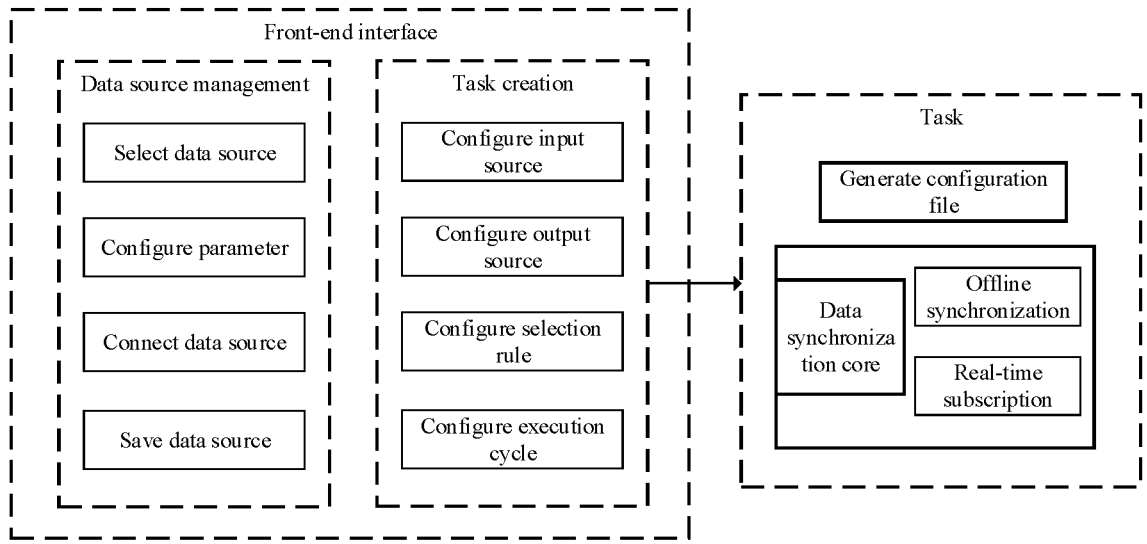
FIG. 10 is a block diagram of a time conversion rule according to an embodiment.

In an example, the synchronization rules mentioned above may include a time conversion rule. As shown in FIG. 10, the system for data synchronization can convert the time in the to-be-synchronized data according to the above time conversion rule. For example, a time can be converted according to types of the time, and a current date/time is obtained, values of year, month, day, hour, minute and second of time field are obtained, time addition and subtraction are performed, and the week is calculated. For example, a time can be converted according to types of the time, and the time in the to-be-synchronized data is converted into 10/13-bit timestamp, date, time, and time fields, etc. For example, a time can be converted according to a format of the time, and the format of the time is converted to yyyy-MM-dd HH: mm: ss (such as 2022-03-01 13:15:18), yyyyMMdd (such as 20220301), yyyy/MM/dd (such as 2022/03/01), and so on. In this example, the time of the to-be-synchronized data can be converted into different types or formats of time data to meet the needs of different businesses.

Figure 11:
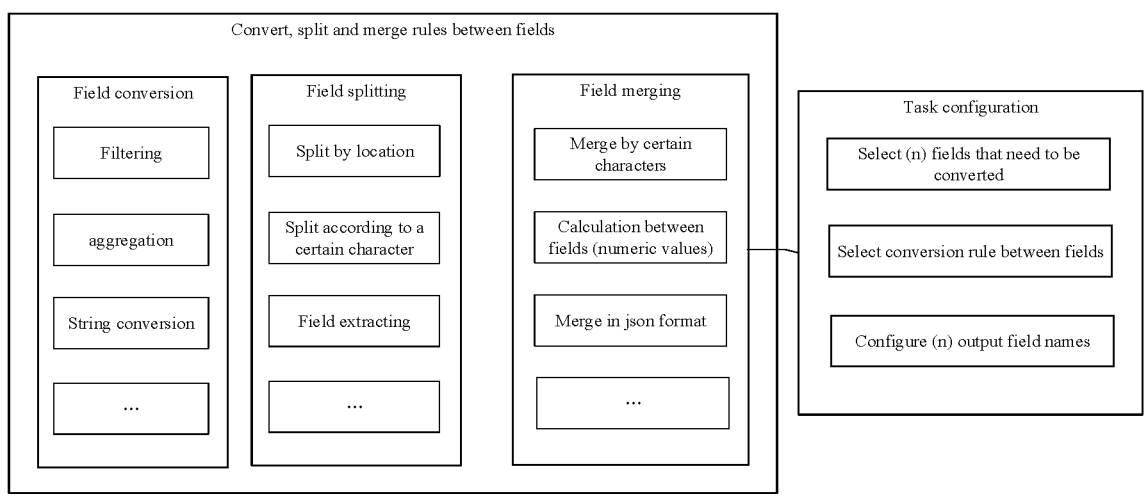
FIG. 11 is a block diagram of a converting, splitting, and merging rules between fields according to an embodiment.

In an example, the synchronization rules mentioned above can include inter-field conversion, splitting, and merging rules. As shown in FIG. 11, the above inter-field conversion, splitting, and merging rules can include field merging, such as by concatenating characters, calculating between fields (values), and merging in JSON format. Taking concatenating characters as an example, for example, the data columns "last name" and "first name" can be merged into one column as "name", for example, the data columns "grade" and "class" can be merged into one column as "grade/class". For example, the above inter-field conversion, splitting, and merging rules can include field splitting, such as splitting by position, splitting by a certain paragraph of text, or field extracting (e.g., substring). Taking splitting by location as an example, the data column "grade/class" is divided into two columns "grade" and "class". As mentioned above, the above inter-field conversion, splitting, and merging rules can include field conversion such as filtering, aggregation, string conversion, and so on. For the string conversion, for example, uppercase letters can be converted to lowercase letters, pinyin can be converted to Chinese characters, and so on. In this example, the fields in the to-be-synchronized data can be converted, split, merged, etc., so that various types of data 688 7828 2279 2121 required can be obtained to meet the needs of various businesses and improve data utilization.

Figure 12:
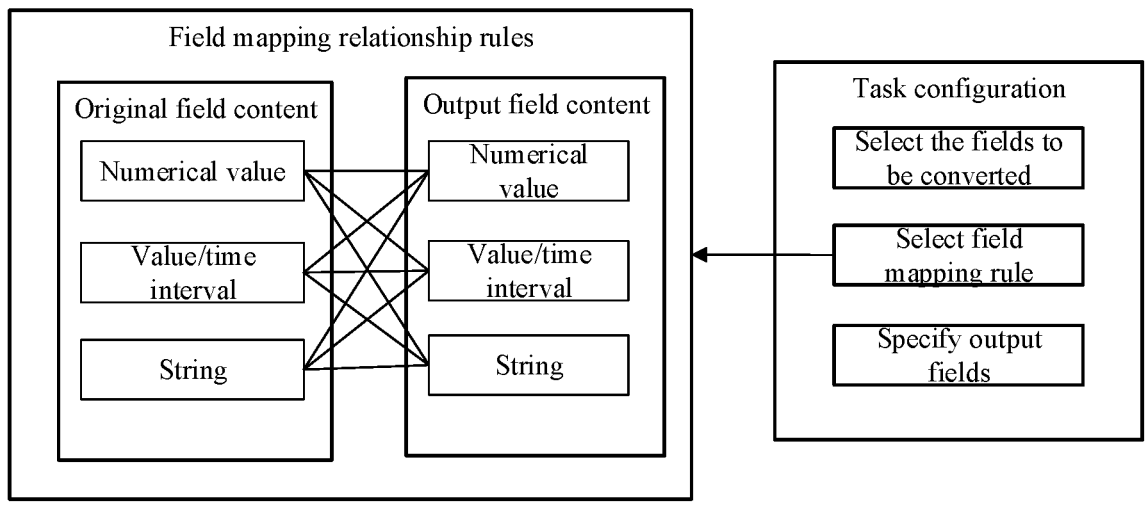
FIG. 12 is a block diagram of a field mapping relationship rule according to an embodiment.

In an embodiment, the above synchronization rules may include a field mapping relationship rule. As shown in FIG. 12, the above field mapping relationship rule can include mapping between an output field content and an original field content, such as mapping the value in the original field content to the value, value/time interval, and string in the output field content separately, mapping the data/time interval in the original field content to the value, data/time interval, and string in the output field content, or mapping the strings in the original field content to the value, data/time interval, and string in the output field content. For example, age data can be converted into an age stage, such as age 1-10 years old corresponding to the age stage infants, age 11-18 years old corresponding to the age stage teenagers, etc. In this embodiment, different field contents can be obtained through field mapping relationship rules, which meets the needs of various businesses and improves data utilization.

Figure 13:
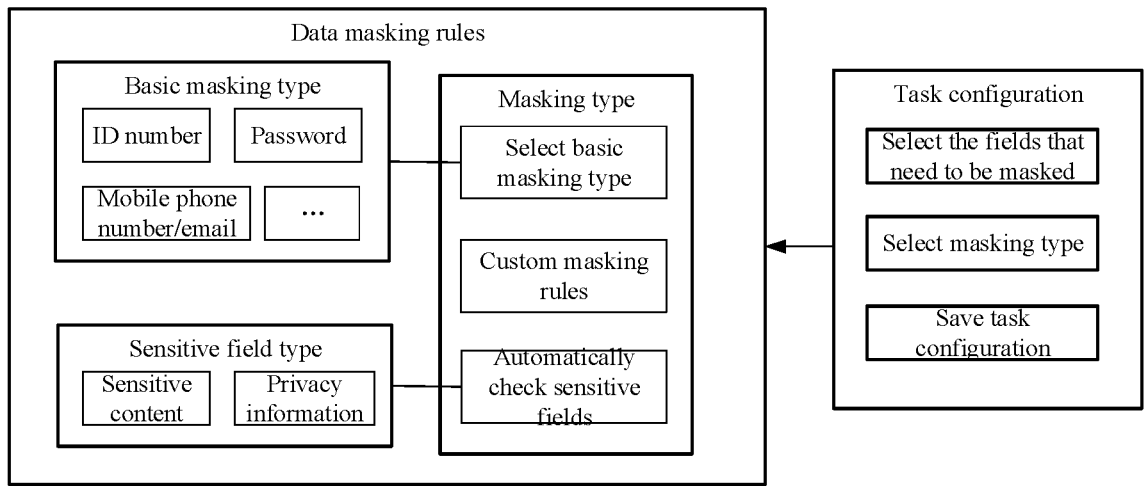
FIG. 13 is a block diagram of a data masking rule according to an embodiment.

In an embodiment, the synchronization rules mentioned above may further include data masking rules. As shown in FIG. 13, the data masking rules can include basic masking type, sensitive field type, and masking type. The basic masking type includes but are not limited to ID number, password, mobile phone number, email, etc. The sensitive field type includes but are not limited to sensitive content, privacy information, etc. The masking type includes but are not limited to selecting basic masking type, customizing masking rule, and automatically checking sensitive fields. For example, a phone number is masked to 139****0588. In this embodiment, the data masking rule can ensure the security of the data synchronization process and avoid information leakage.

It should be noted that in this step, the synchronization rules can include first preset rules, where the first preset rules refer to rules for processing the to-be-synchronized data itself, which are used for each piece of to-be-synchronized data, such as the time conversion rule, the inter-field splitting and merging rules, the field mapping rule, the sensitive word masking rule, etc. The synchronization rules can further include second preset rules, where the second preset rules refer to rules that use preset models (such as neural network models, speech processing models, text processing models, etc.) to process a preset quantity (such as hundreds to tens of thousands) of to-be-synchronized data. The second preset rules are used for batch processing, such as extracting events from the to-be-synchronized data or semantic parsing. The skilled in the art can choose appropriate synchronization rules based on specific scenarios, and corresponding solutions fall within the scope of protection of the present disclosure.

In step 35, after obtaining the synchronization rules, the system for data synchronization can continue to detect operations in the second interactive interface. When detecting an operation of selecting a target data source, the system can obtain the selected target data source in response to the operation of selecting the target data source in the second interactive interface. It is understandable that the target data source mentioned above can be selected from the data source list mentioned above, and the specific content can refer to the method of obtaining the source data source.

In step 36, after obtaining the synchronization rules, the system for data synchronization can continue to detect operations in the second interactive interface. When detecting an operation of configuring the execution cycle and frequency, the system can obtain the configured execution cycle and frequency in response to the operation of configuring the execution cycle and frequency in the second interactive interface. The above execution cycle can include but are not limited to one day, one week, or one month, The above frequency can include but are not limited to once a day (or multiple times a day), once a week (or multiple times a week), or once a month (or multiple times a month). It can be understood that the above execution cycle and frequency can be set selectively. For example, if the execution cycle is set, there is no need to set the frequency, or if the frequency is set, there is no need to set the cycle, etc., which can be set according to specific scenarios. In this way, in this step, by configuring the execution cycle and frequency, data transmission between the source database and the target database matches, which ensures transmission efficiency, and further ensures that data synchronization can meet the data transmission requirements of data synchronization tasks.

In step 37, after obtaining the execution cycle and frequency, the system for data synchronization can continue to detect operations in the second interactive interface. When detecting an operation of creating a data synchronization task, the system can create a data synchronization task (i.e., a target task) in response to the operation of creating a data synchronization task in the second interactive interface. It is understandable that the above target task is for synchronizing the to-be-synchronized data from the source data source to the target data source according to the execution cycle, frequency, and synchronization rules mentioned above. In this way, the system for data synchronization can visually display various options in the second interactive interface, and users can create target tasks through visual operations, which is simple, fast, and efficient.

In step 13, in response to an operation of starting the data synchronization task in the third interactive interface, the to-be-synchronized data from the source data source is synchronized to the target data source.

In this embodiment, after creating the data synchronization task (i.e., the target task), the system for data synchronization can display an interactive interface containing an option to start the data synchronization task. The interactive interface is later referred to as the third interactive interface. Users can select a task list for the data synchronization task, select at least one task from the task list, and select to start the data synchronization task. The system for data synchronization can detect operations in the third interactive interface. When detecting an operation of starting a data synchronization task, the system can synchronize the to-be-synchronized data from the source data source to the target data source in response to the operation of starting the data synchronization task in the third interactive interface.

Figure 4:
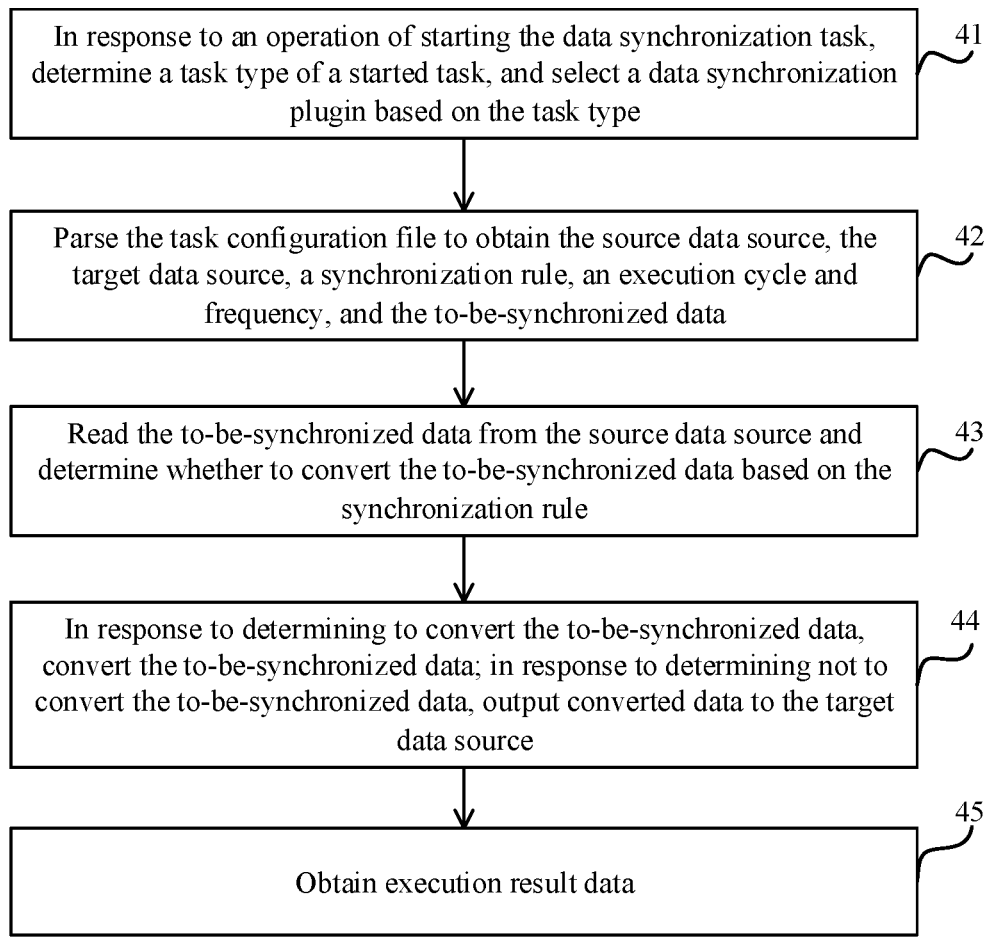
FIG. 4 is a flowchart of synchronizing data according to an embodiment.

As shown in FIG. 4, in step 41, the system for data synchronization can determine a task type of the started task in response to the operation of starting the data synchronization task, and select a corresponding data synchronization plugin based on the task type. The data synchronization plugin is the data ETL tool mentioned in the above embodiments.

In step 42, the system for data synchronization can parse the task configuration file to obtain the source data source and target data source in step 11, synchronization rules, execution cycle and frequency, and the to-be-synchronized data.

In step 43, the above data synchronization plugin can read the to-be-synchronized data from the source data source and determine whether to convert the to-be-synchronized data according to the preset synchronization rules.

In step 44, when it is determined that the to-be-synchronized data needs to be converted, in response to determining to convert the to-be-synchronized data, the data synchronization plugin can convert the to-be-synchronized data; and in response to determining not to convert the to-be-synchronized data, output converted data to the target data source.

In step 45, the system for data synchronization can obtain execution result data and write the execution result data to the synchronization record.

In an embodiment, considering the actual needs of users to update synchronization rules during the data synchronization process, the synchronization rules in the system for data synchronization in this embodiment adopt a hot update manner, that is, the synchronization rules are updated without affecting data synchronization, and after the synchronization rules are updated, the synchronization rules can replace the previous synchronization rules and be put into use.

Figure 5:
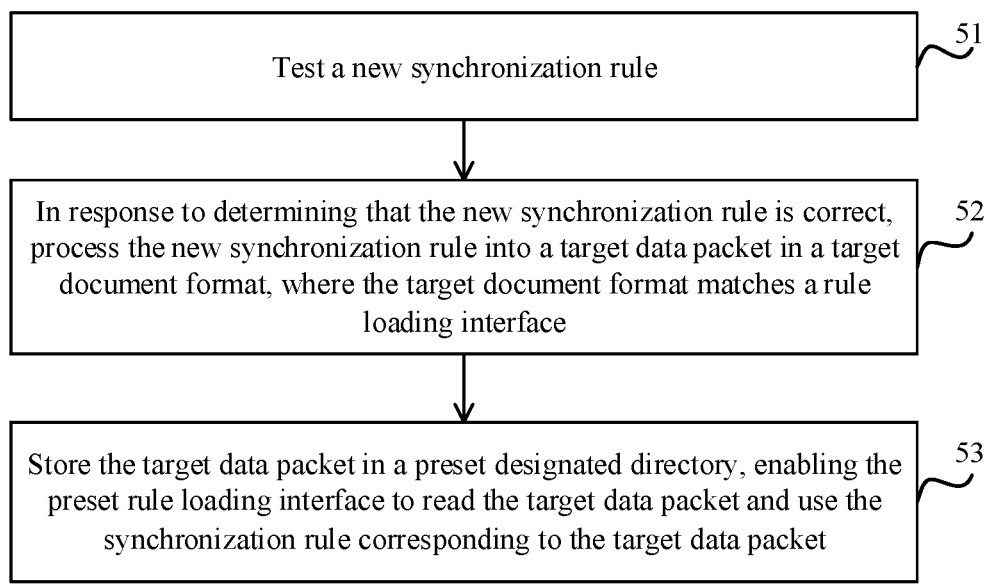
FIG. 5 is a flowchart of hot updating a synchronization rule according to an embodiment.

In an example, as shown in FIG. 5, in step 51, the system for data synchronization can obtain new synchronization rules and test them.

In step 52, the system for data synchronization can process the new synchronization rules as a target data package in the target document format (such as jar format) when the new synchronization rules are correct, and the target document format matches the rule loading interface.

In step 53, the system for data synchronization can store the target data packet in a preset designated directory (such as the transformPlugin target), so that the preset rule loading interface can read the target data packet and use the synchronization rules corresponding to the target data packet.

For example, in this example, the new synchronization rules can be processed as a jar package and placed under the transformPlugin target. During the data synchronization process, the rule loading interface can load all jar packages under the transformPlugin target. Then, the system for data synchronization can determine whether the synchronization rules can be used normally. If the synchronization rules cannot be used normally, the system for data synchronization rolls back and deletes the newly synchronized jar package, and reloads the rule jar package. If the synchronization rules can be used normally, the hot update ends. In this step, the system for data synchronization can generate a task progress bar (or task completion ratio) during the data synchronization process. The proportion or sliding in the task progress bar represents the proportion of currently synchronized data to all data. After all tasks are completed, the system for data synchronization can generate a task completion indicator, such as a task progress bar displaying 100%, "completed", or switching to the completed menu, which facilitates users to keep track of the task progress timely. In this way, in this example, updating the synchronization rules through hot update can adjust the rules without affecting the data synchronization process, which is beneficial for improving data synchronization efficiency and improving user experience.

In an example, the system for data synchronization can modify the target configuration parameters of the configuration table in the task configuration file in response to the operation of modifying the target configuration parameters. The above task configuration file is stored in the target database, which can be the local database corresponding to the system for data synchronization. In this way, in this example, using hot update to update the target configuration parameters can ensure that the configuration parameters take effect without stopping the data synchronization task, which is beneficial for improving data synchronization efficiency and improving user experience.

The solutions provided in the present disclosure can connect multiple data sources in response to the operation of configuring data sources in the first interactive interface. Then, in response to the operation of creating a task in the second interactive interface, a task configuration file can be generated. Afterwards, in response to the operation of starting the data synchronization task in the third interactive interface, the to-be-synchronized data is synchronized from the source data source to the target data source. In this way, in the embodiments, data transmission between different data sources can be achieved through visual configuration operations, without the need for repeated development, and the configuration process is simple, greatly reducing learning costs.

Figure 6:
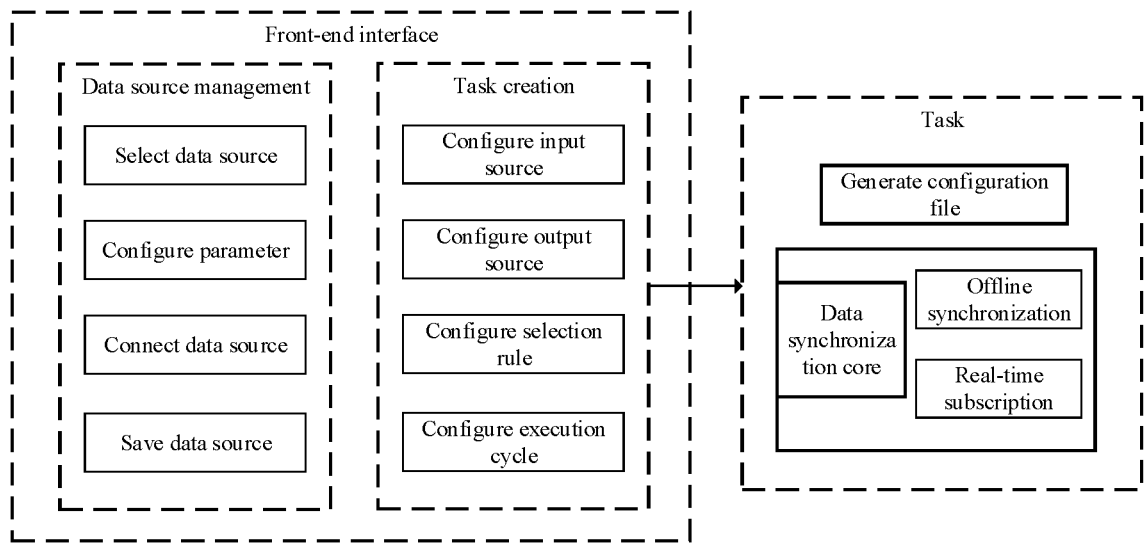
FIG. 6 is a schematic diagram of an architecture of a system for data synchronization according to an embodiment.

The following describes the working principle of a system for data synchronization in conjunction with an embodiment, as shown in FIG. 6, including:

1. Data Source Creation Process

Figure 7:
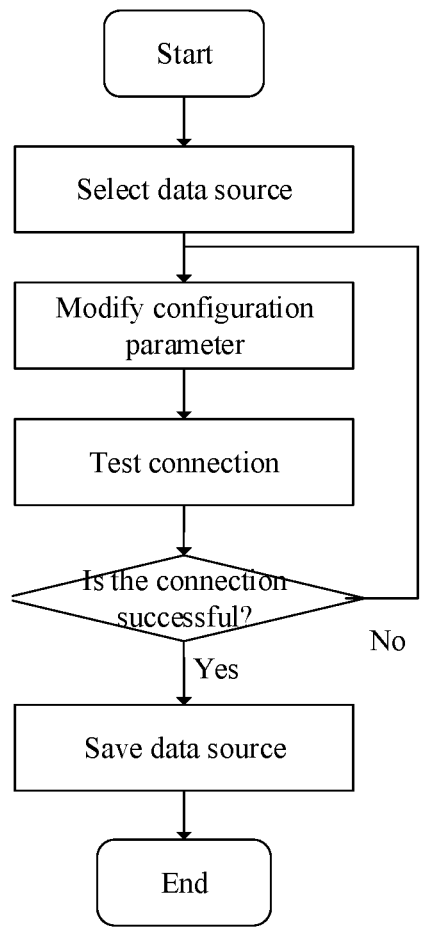
FIG. 7 is a flowchart of obtaining a data source according to an embodiment.

As shown in FIG. 7, the system for data synchronization can display the first interactive interface. In the first interactive interface, users can select data sources, including source data source and the target data source, such as MySQL, Hdfs, API, and so on. The system for data synchronization can display prompt information in the first interactive interface to enable users to fill in the corresponding configuration parameters based on the prompt information in the first interactive interface and obtain the target configuration parameters. Then, the system for data synchronization can test the connection. If the connection is successful, the system for data synchronization can store the data sources; If the connection fails, the user is prompted to verify the configuration parameters until the connection is successful before saving the data sources.

2. Task Creation Process

Figure 8:
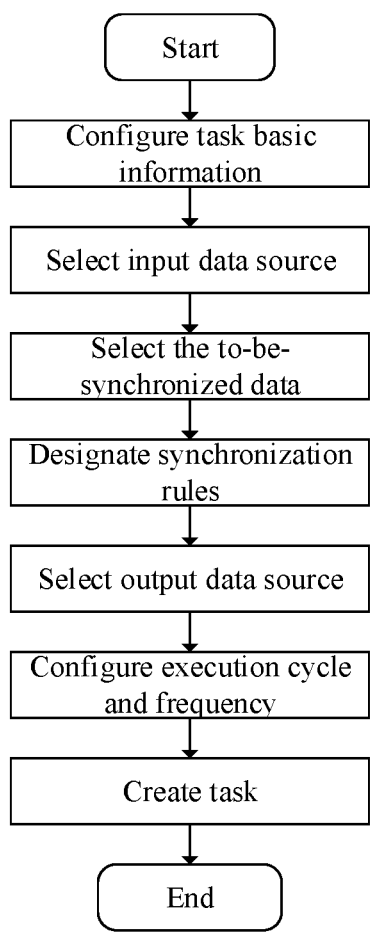
FIG. 8 is a flowchart of creating a task according to an embodiment.

As shown in FIG. 8, the system for data synchronization can display a second interactive interface and generate task information that prompts the user to proceed with the task creation process, such as the project and business. Then, a data source for data input is selected, which is the source data source, where the source data source is selected from the data sources already created in step (1) above. Therefore, if there is no required data source, it is needed to return to step (1) to create the data source.

Then, after the source data source is selected, data stored in the data source can be viewed, the to-be-synchronized data (such as databases, tables, and fields) is selected according to needs, and data synchronization rules are further configured based on the type of data source (for example, SQL databases can specify SQL statements to synchronize the executed results).

Afterwards, an output data source (i.e., the target data source) is selected. The execution cycle and frequency are configured, and the task is created.

3. Task Execution Process

Figure 9:
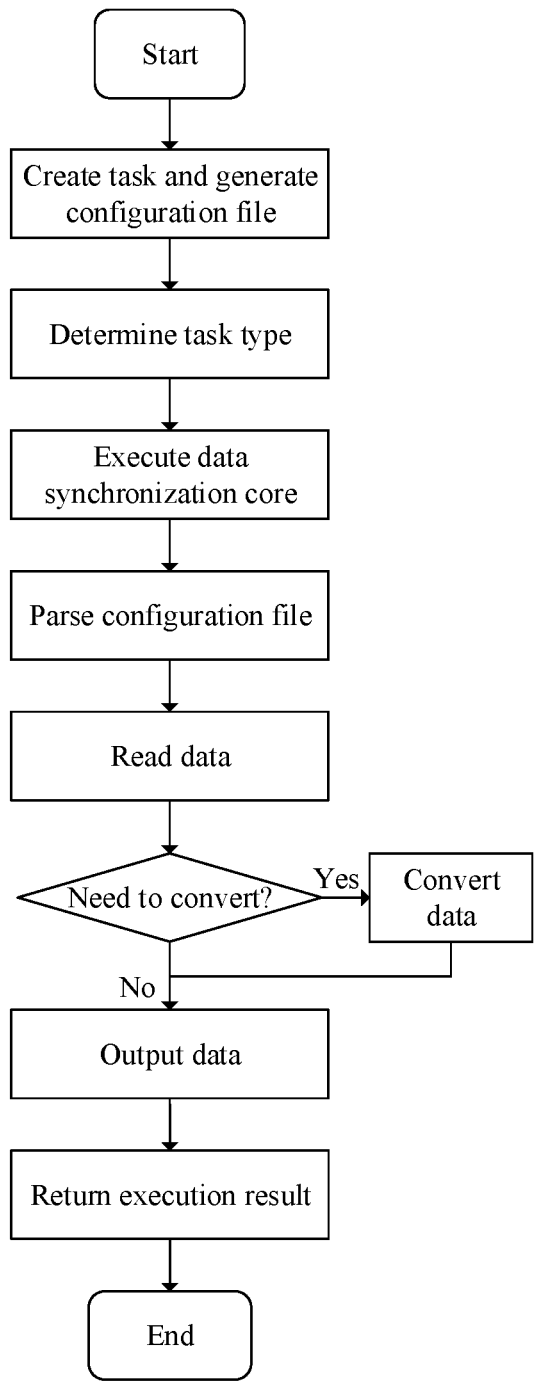
FIG. 9 is a flowchart of synchronizing data according to an embodiment.

As shown in FIG. 9, after the task creation is completed, the system for data synchronization can generate a task configuration file. The system for data synchronization can display a third interactive interface to start the task based on the user's operation of starting a task. At this point, the system for data synchronization can choose whether to start offline synchronization plugins or real-time subscription plugins based on the task type. After the task starts, the configuration file is parsed, and the configuration parameters for connecting to the data sources are obtained, and the to-be-synchronized data is read. After the to-be-synchronized data is read, it is determined whether data conversion is required based on the configuration file. If the data conversion is not required, the to-be-synchronized data is directly output to the target data source. If the data conversion is required, the to-be-synchronized data is output to the target data source after the data conversion process. After the execution is completed, the result of the execution is returned and displayed on the third interactive interface.

4. Task Synchronization Rules

Synchronization rules can include a first preset rule and a second preset rule, where the first preset rule is used for processing the to-be-synchronized data, such as time conversion, field splitting and merging, mapping relationships between fields, sensitive field masking, and so on. The second preset rules refer to rules that use preset models (such as neural network models, speech processing models, text processing models, etc.) to process a preset quantity (such as hundreds to tens of thousands) of to-be-synchronized data, which includes rules of preset models, and is used for batch processing, such as extracting events or semantic parsing from the to-be-synchronized data. The skilled in the art can choose appropriate synchronization rules based on specific scenarios, and corresponding solutions fall within the scope of protection of the present disclosure.

(1) Time Conversion Rule

As shown in FIG. 10, the time conversion rule can include time format conversion and time type conversion. The time format conversion can include but is not limited to yyyy-MM-dd HH: mm: ss format, yyyyMMdd format, yyyy/MM/dd format, and so on. The time type conversion can include but is not limited to 10/13-bit timestamps, date, time, time fields, and so on. Time type conversion can include but is not limited to obtaining the current date/time, obtaining the value of the time field year, month, day, hour, minute, second, time addition/subtraction, and calculating the week. The skilled in the art can choose based on specific scenarios, and the corresponding solutions fall within the scope of protection of the present disclosure.

In an example, the event_time with 13-bit timestamp field is converted to event_date in yyyy-MM-dd HH: mm: ss format, as shown in Table 3.

TABLE 3

Time Stamp and Specific Time Conversion

| event_time | event_date |
|---|---|
| 1627351547610 | 2021 Jul. 27 10:05:47 |

(2) Conversion, Splitting, and Merging Rules Between Fields

As shown in FIG. 11, the conversion, splitting, and merging rules between fields include field conversion rules, field splitting rules, and field merging rules. The field conversion rules include but are not limited to filtering fields, aggregating fields, string converting, etc. The field splitting rules include but are not limited to splitting by position, splitting by a certain character segment, and field truncation. Field merging rules include but are not limited to concatenating by certain characters, calculating between fields (numerical values), merging in JSON format, and so on.

In an example, the string str is split into str1 and str2 fields according to "-", as shown in Table 4.

TABLE 4

String Splitting Rules

| Str | Str1 | Str2 |
|---|---|---|
| Henan Province-Zhengzhou City | Henan Province | Zhengzhou City |

(3) Field Mapping Rules

As shown in FIG. 12, the field mapping rules can include mapping between an output field content and an original field content, such as mapping the value in the original field content to the value, value/time interval, and string in the output field content separately, mapping the data/time interval in the original field content to the value, data/time interval, and string in the output field content, or mapping the strings in the original field content to the value, data/time interval, and string in the output field content.

In an example, age data is converted into an age stage, as shown in Table 5.

(4) Field Masking Rules

As shown in FIG. 13, the data masking rules can include basic masking type, sensitive field type, and masking type. The basic masking type includes but are not limited to ID number, password, mobile phone number, email, etc. The sensitive field type includes but are not limited to sensitive content, privacy information, etc. The masking type includes but are not limited to selecting basic masking type, customizing masking rule, and automatically checking sensitive fields. For example, a phone number is masked to 139****0588.

TABLE 5 conversion rules for age data "age" and age stage "stage"

| Age | Stage |
|---|---|
| 1-10 | Infants and young children |
| 11-18 | Youngsters |
| 19-35 | Youth |
| 36-50 | Prime age |
| 51-65 | Middle age |
| >65 | Old age |

(5) Synchronization Rule Hot Update

Figure 14:
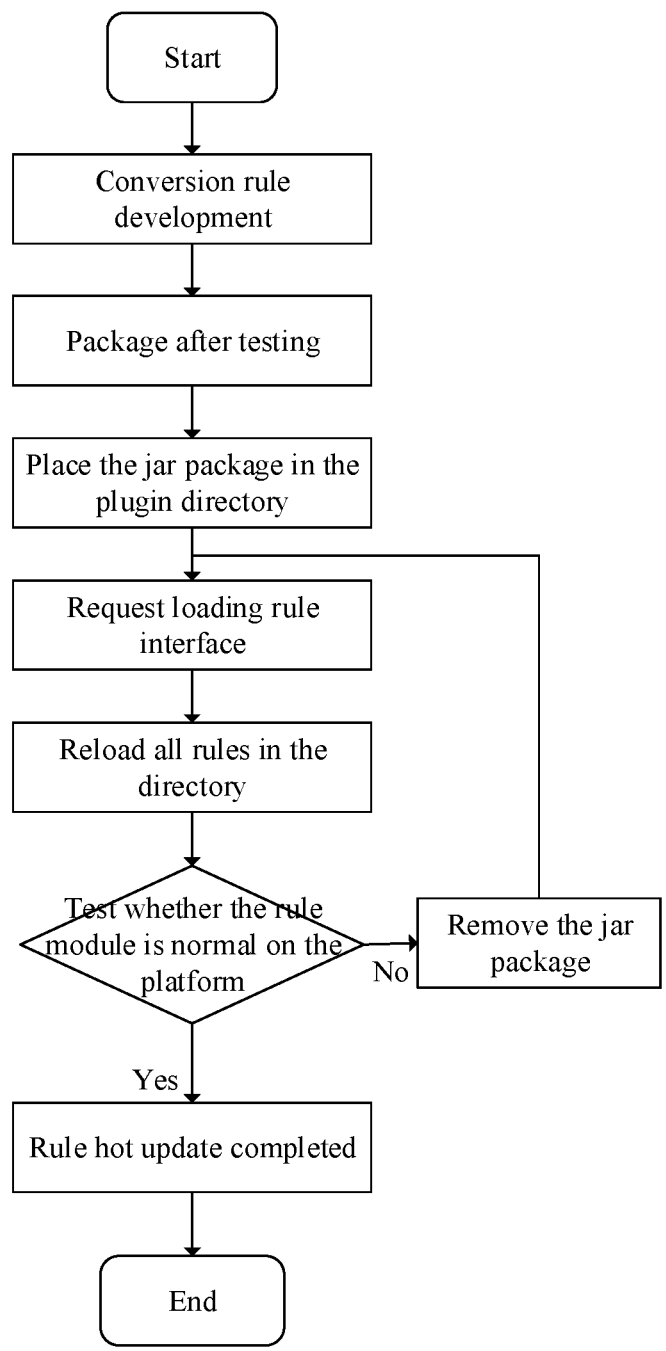
FIG. 14 is a flowchart of hot updating a synchronizing rule according to an embodiment.

As shown in FIG. 14, in order to ensure that the synchronization rule update process does not affect the data synchronization business, the synchronization rule can be packaged as a detachable rule component. After completing the development of a synchronization rule, the jar package of the synchronization rule can be placed in the transformPlugin directory and the rule loading interface of the synchronization rule is requested to be loaded, to load all jar packages in the directory. Then, it is observed whether the synchronization rules on the system for data synchronization are normal. If the synchronization rules on the system for data synchronization are not normal, rolling back is performed, the jar package is deleted, and the rule jar package is requested to be reloaded; If the synchronization rules on the system for data synchronization are normal, the hot update ends.

(6) Hot Update of Task Configuration Parameters

Figure 15:
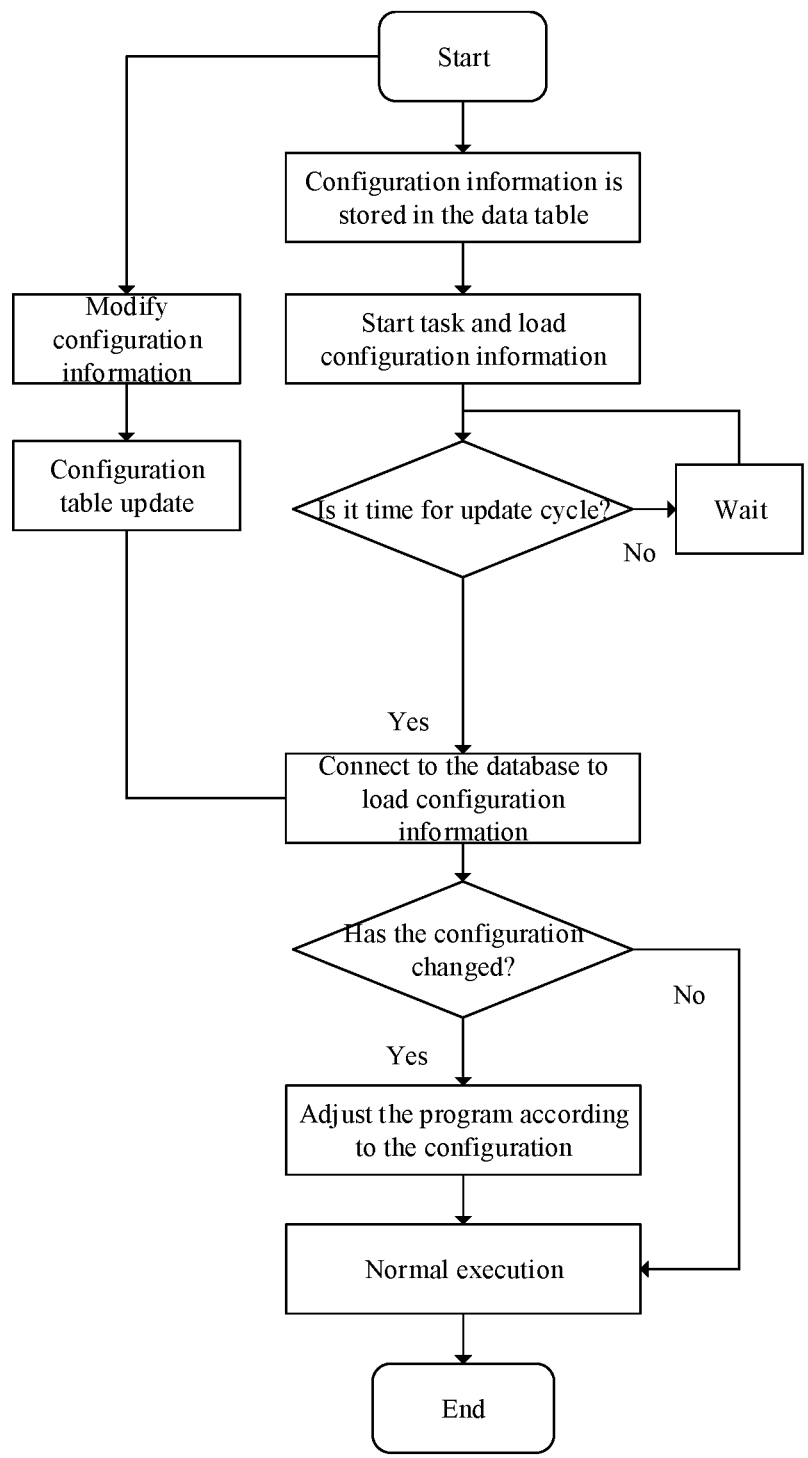
FIG. 15 is a flowchart of hot updating parameters according to an embodiment.

As shown in FIG. 15, in this example, for real-time subscription tasks, unlike offline tasks, real-time tasks do not stop once they start executing. When the user wants to modify the task configuration file, the data synchronization rules are stored in the target database. When the synchronization rules are modified, the configuration table is directly updated. During the execution of data synchronization tasks, in order to take effect without stopping the task, the synchronization rules in the configuration table are periodically read in the program. If the configuration table has not changed, it does not need to be changed for normal execution. If the configuration table has changed, adjustments can be made immediately and execution can continue.

Figure 16:
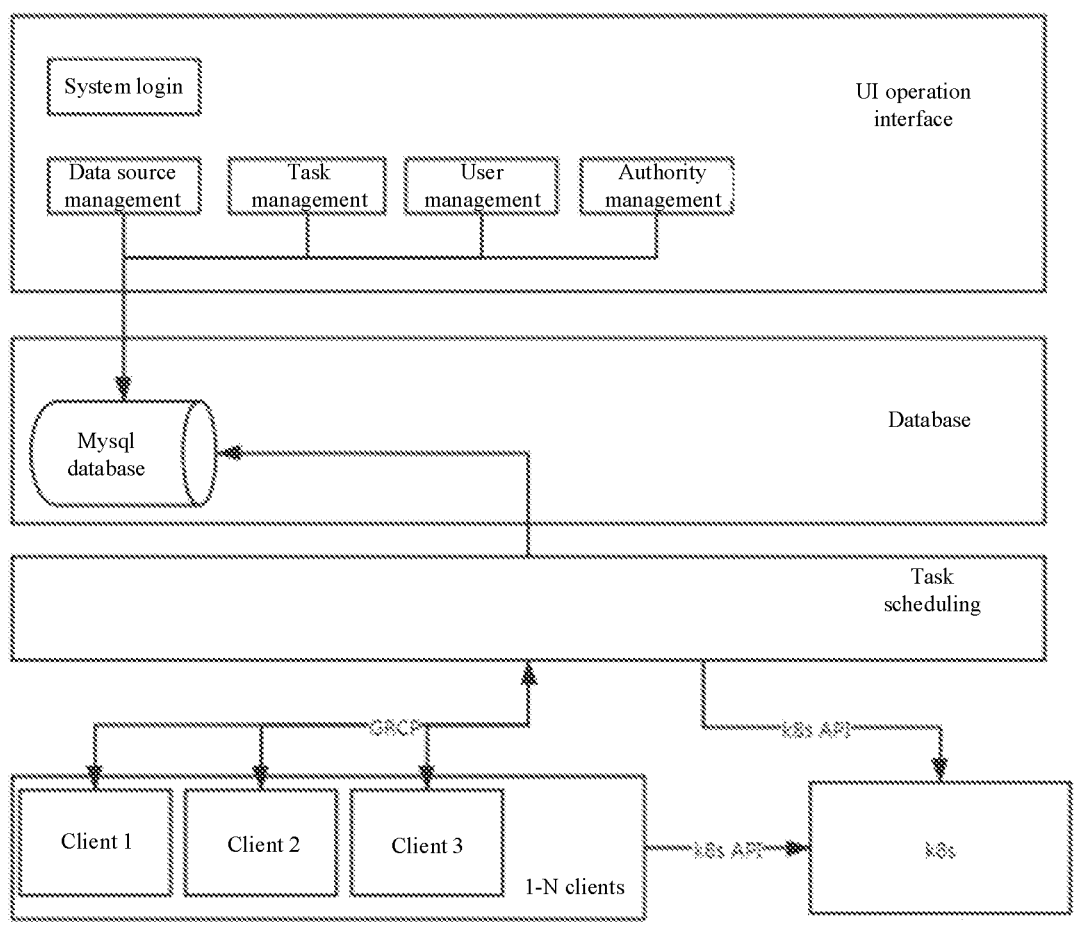
FIG. 16 is a block diagram of a system for data synchronization according to an embodiment.
Figure 17:
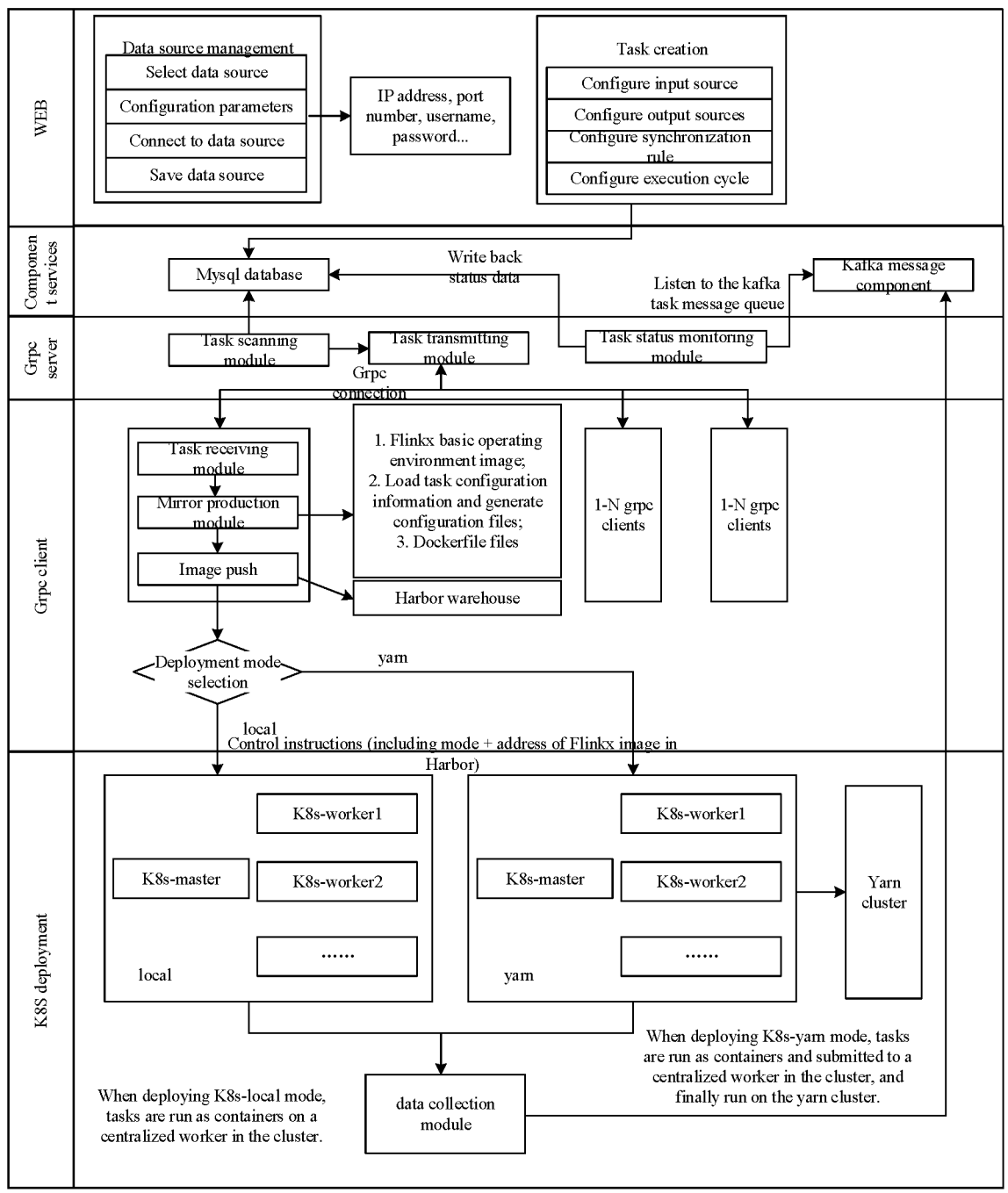
FIG. 17 is a block diagram of a system for data synchronization according to an embodiment.

The following describes the working principle of a system for data synchronization in conjunction with an embodiment, as shown in FIGS. 16 and 17, including:

0, Preparation Work

Data source management (add, modify, delete, etc.), task management (add, modify, delete, publish, log view, etc.), permission management, user management functions, and service interfaces are developed. These functions can be completed in the interactive page. Image creation and image publishing functions based on Docker API are developed. Task deployment and task log viewing functions based on the k8s API are developed. Task management server and task execution client functions based on the GRPC protocol are developed. The server distributes tasks to the execution client, and the client can complete task execution in the local environment and K8S environment according to different configuration strategies. Customization development can also be carried out to complete environment-based task execution. The above WEB end and backend (i.e., server and client) constitute the system for data synchronization in the embodiments of the present disclosure.

1. Configuring Data Sources

Data sources are added. Link test and addition of data sources supporting MySQL/postgreSQL/clickhouse/live/ lastsearch/rest API/mongodb/redis/hdfs/kafka are performed. Data source IP, address, port, username, password, and other information are input. After authentication, the data source information is stored to the MySQL database. Each user who logs into the system can only see and use the data sources the user created.

2. Selecting Source Data Source and Target Data Source and Completing Data Synchronization Task Creation The source data source and the data table (the data table supports all or part of the fields) are selected from the configured data source list in (1), and the target data source and the data table are selected from the configured data source list, to complete the configuration of the source data source and the target data source. The system for data synchronization completes a Flinkx based configuration file based on the configuration of the source data source and the target data source, for use in subsequent Flinkx tasks. It is understandable that the Flinkx is only one of the methods, and data synchronization can also be achieved using methods such as DataX, and the corresponding solution also falls within the protection scope of the present disclosure.

For example, the task name and task scheduling time (supporting both single execution and daily scheduled execution) are filled in, to complete task creation, and the data is stored in the MySQL database.

The task scheduling module starts the grpc server and waits for connections of 1-N clients for task execution. The task scheduling module is responsible for scanning the database for unexecuted tasks, scanning every 10 seconds. After discovering a new task, one of the 1-N clients is selected (randomly or by polling algorithm) and the task distribution from server to client is completed through the grpc protocol. The task execution client may encounter an abnormal exit, and in this case, the task execution server needs to release the client to ensure that subsequent new tasks are not distributed to the client.

Running tasks are executed, the k8s API is called to query the task execution status (running, completed, error), and the task status and task logs of the database are modified for subsequent log queries and task monitoring.

3. Image Construction

After receiving the new task, the task execution client completes the task configuration file generation based on Flinkx, and complete the task image construction through the task configuration file and Flinkx based image, and the completed image is published in the Harbor image warehouse.

4. Task Deployment

After the server starts, the client starts. After the client starts, a GRPC link is established with the server to complete the client registration. After the server notifies that there is a new task, the client generates a Flinkx based task configuration file, generates a new Flinkx based image, and uploads it to the Harbor image warehouse. A control instruction is sent to the k8s server, where the control instruction includes the selected deployment mode and the address of the Flinkx image in the Harbor, that is, the k8s API is called to complete the task image deployment. K8s can download the Flinkx image from the Harbor warehouse based on the address and deploy the Flinkx image. After successful deployment, tasks are automatically executed according to the configuration file. During the task execution process and after the task is completed, the data collection module in k8s can collect various types of data, such as task execution time, end time, number of synchronized data pieces, and traffic used, and send the above types of data to the Kafka message component. The task status monitoring module in the gprc server can listen to the Kafka message component. When new messages (i.e. various types of data) are heard, the above messages can be consumed and written back to the MySQL database, that is, the various states of the task are adjusted, such as task progress, completed data items, start time, end time, etc., which makes it convenient for users to view task information from the interactive interface on the WEB side.

5. Task Monitoring

The UI operation page (i.e., interactive interface) of the system for data synchronization can view detailed information of each task, including start execution time, end execution time, execution environment, execution status, execution logs, and other information.

Figure 18:
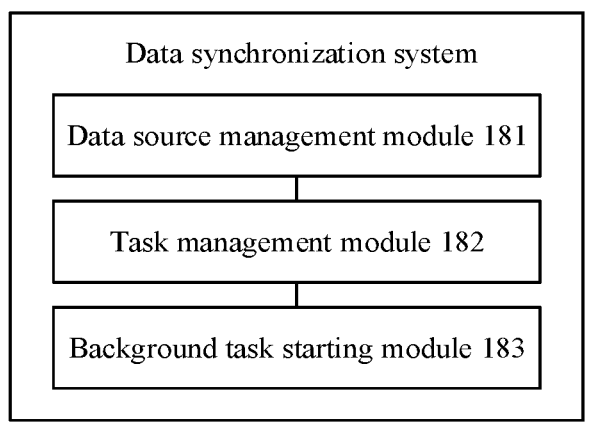
FIG. 18 is a block diagram of a system for data synchronization according to an embodiment.

The embodiments of the present disclosure further provide a system for data synchronization, as shown in FIG. 18, which includes a data source management module 181, a task management module 182, and a background task starting module 183; wherein the data source management module 181 is configured to, in response to an operation of configuring data sources in a first interactive interface, connect the data sources;

the task management module 182 is configured to, in response to an operation of creating a task in a second interactive interface, generate a task configuration file; and the background task starting module 183 is configured to, in response to an operation of starting a data synchronization task in a third interactive interface, synchronize to-be-synchronized data from a source data source to a target data source.

In some embodiments, when in response to the operation of configuring the data sources in the first interactive interface, connecting the data sources, the data source management module performs:

in response to an operation of selecting data sources in the first interactive interface, obtaining the data sources corresponding to the operation, wherein the data sources include a source data source and a target data source;

in response to an operation of modifying a configuration parameter in the first interactive interface, obtaining a target configuration parameter;

in response to an operation of testing a connection between the source data source and the target data source in the first interactive interface, attempting to connect the source data source and the target data source; and in response to successful connection, saving the data source; or, in response to unsuccessful connection, re-obtaining a target configuration parameter.

In some embodiments, the task management module updating the synchronization rule in the manner of the hot update comprises:

in response to an operation of modifying the target configuration parameter, modifying the target configuration parameter of a configuration table in the task configuration file, wherein the task configuration file is stored in the target database.

In some embodiments, when in response to the operation of creating the task in the second interactive interface, generating the task configuration file, the task management module performs:

in response to an operation of configuring task information in the second interactive interface, obtaining task information;

in response to an operation of selecting the source data source in the second interactive interface, obtaining the source data source;

in response to an operation of selecting to-be-synchronized data in the second interactive interface, obtaining the to-be-synchronized data;

in response to an operation of selecting a synchronization rule in the second interactive interface, obtain the synchronization rule;

in response to an operation of selecting the target data source in the second interactive interface, obtaining the target data source;

in response to an operation of configuring an execution cycle and frequency in the second interactive interface, obtaining the execution cycle and frequency; and in response to an operation of creating a data synchronization task in the second interactive interface, creating a target task, wherein the target task is used for synchronizing the to-be-synchronized data from the source data source to the target data source according to the execution cycle and frequency, and the synchronization rule.

In some embodiments, when in response to the operation of starting the data synchronization task in the third interactive interface, synchronizing the to-be-synchronized data from the source data source to the target data source, the background task starting module performs:

in response to an operation of starting the data synchronization task, determining a task type of a started task, and selecting a data synchronization plugin based on the task type;

parsing the task configuration file to obtain the source data source, the target data source, a synchronization rule, an execution cycle and frequency, and the to-be-synchronized data;

reading the to-be-synchronized data from the source data source, and determining whether to convert the to-be-synchronized data based on the synchronization rule;

in response to determining to convert the to-be-synchronized data, converting the to-be-synchronized data; in response to determining not to convert the to-be-synchronized data, outputting converted data to the target data source; and obtaining execution result data.

In some embodiments, the task management module is further configured to update a synchronization rule in a manner of hot update.

In some embodiments, the task management module updating the synchronization rule in the manner of the hot update comprises:

testing a new synchronization rule;

in response to determining that the new synchronization rule is correct, processing the new synchronization rule into a target data packet in a target document format, wherein the target document format matches a rule loading interface; and storing the target data packet in a preset designated directory, enabling the preset rule loading interface to read the target data packet and use the synchronization rule corresponding to the target data packet.

It should be noted that the system shown in this embodiment matches the content of the method embodiment, and can refer to the content of the above system embodiment, which will not be repeated here.

In embodiments, a computer-readable storage medium is further provided, such as a memory including executable computer programs that can be executed by a processor to implement the method of the embodiment shown in FIG. 3. The readable storage medium may be a Read-Only Memory (ROM), a Random Access Memory (RAM), a CD-ROM, a magnetic tape, a floppy disk and an optical data storage device, etc.

After considering and practicing the disclosure of the specification, other embodiments of the present disclosure will be readily apparent to those skilled in the art. The present disclosure is intended to cover any modification, use or adaptation of the present disclosure. These modifications, uses or adaptations follow the general principles of the present disclosure and include common knowledge and conventional technical means in the technical field that are not disclosed in the present disclosure. The specification and embodiments herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The invention claimed is:

1. A method for data synchronization, comprising:

in response to an operation of configuring data sources in a first interactive interface, connecting the data sources;

in response to an operation of creating a task in a second interactive interface, generating a task configuration file; and in response to an operation of starting a data synchronization task in a third interactive interface, synchronizing to-be-synchronized data from a source data source to a target data source;

wherein in response to the operation of configuring the data sources in the first interactive interface, connecting the data sources comprises:

in response to an operation of selecting data sources in the first interactive interface, obtaining the data sources corresponding to the operation, wherein the data sources include the source data source and a target data source;

in response to an operation of modifying a configuration parameter in the first interactive interface, obtaining a target configuration parameter;

in response to an operation of testing a connection between the source data source and the target data source in the first interactive interface, attempting to connect the source data source and the target data source; and in response to a successful connection, saving the data sources;

wherein a synchronization rule adopts hot update, and the method further includes:

in response to an operation of modifying the target configuration parameter, modifying the target configuration parameter of a configuration table in the task configuration file, wherein the task configuration file is stored in a target database.

2. The method according to claim 1, wherein in response to the operation of creating the task in the second interactive interface, generating the task configuration file comprises:

in response to an operation of configuring task information in the second interactive interface, obtaining task information;

in response to an operation of selecting the source data source in the second interactive interface, obtaining the source data source;

in response to an operation of selecting to-be-synchronized data in the second interactive interface, obtaining the to-be-synchronized data;

in response to an operation of selecting a synchronization rule in the second interactive interface, obtaining the synchronization rule;

in response to an operation of selecting the target data source in the second interactive interface, obtaining the target data source;

in response to an operation of configuring an execution cycle and frequency in the second interactive interface, obtaining the execution cycle and frequency; and in response to an operation of creating a data synchronization task in the second interactive interface, creating a target task, wherein the target task is used for synchronizing the to-be-synchronized data from the source data source to the target data source according to the execution cycle and frequency, and the synchronization rule.

3. The method according to claim 1, wherein in response to the operation of starting the data synchronization task in the third interactive interface, synchronizing the to-be-synchronized data from the source data source to the target data source comprises:

in response to an operation of starting the data synchronization task, determining a task type of a started task, and selecting a data synchronization plugin based on the task type;

parsing the task configuration file to obtain the source data source, the target data source, a synchronization rule, an execution cycle and frequency, and the to-be-synchronized data;

reading the to-be-synchronized data from the source data source and determining whether to convert the to-be-synchronized data based on the synchronization rule;

in response to determining to convert the to-be-synchronized data, converting the to-be-synchronized data; in response to determining not to convert the to-be-synchronized data, outputting converted data to the target data source; and obtaining execution result data.

4. The method according to claim 3, wherein the synchronization rule adopts hot update.

5. The method according to claim 4, wherein the synchronization rule adopting the hot update comprises:

testing a new synchronization rule;

in response to determining that the new synchronization rule is correct, processing the new synchronization rule into a target data packet in a target document format, wherein the target document format matches a rule loading interface; and storing the target data packet in a preset designated directory, enabling the preset rule loading interface to read the target data packet and use the synchronization rule corresponding to the target data packet.

6. A non-transitory computer-readable storage medium, wherein when an executable computer program in the storage medium is executed by a processor, the method according to claim 1 is implemented.

* * * * *